W. R. WARD.
MATCH BOX HOLDER FOR AUTOMOBILES.
APPLICATION FILED APR. 20, 1918.
1,289,978.
Patented Dec. 31, 1918.
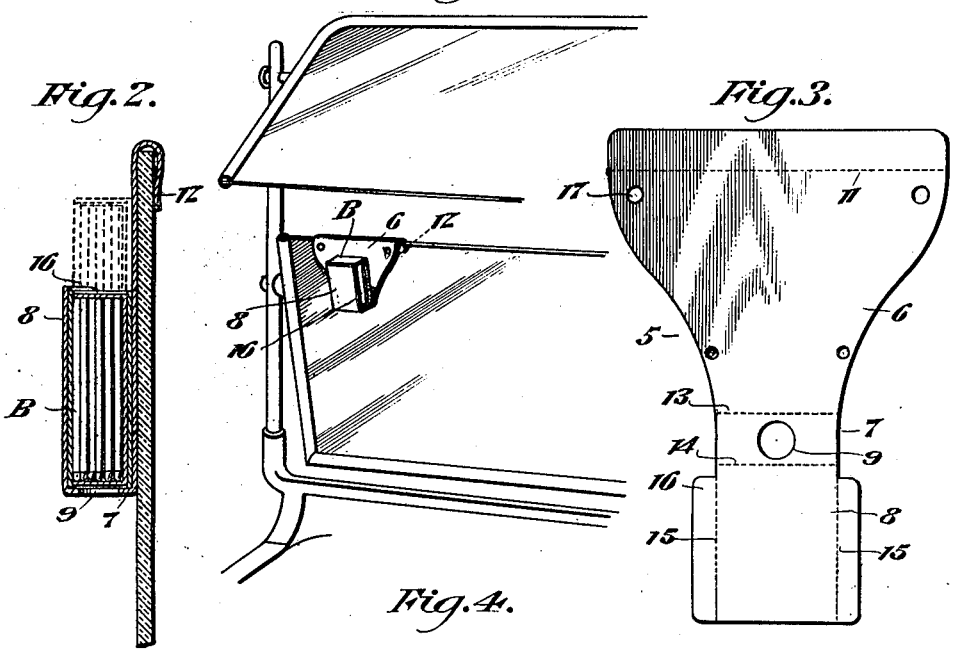
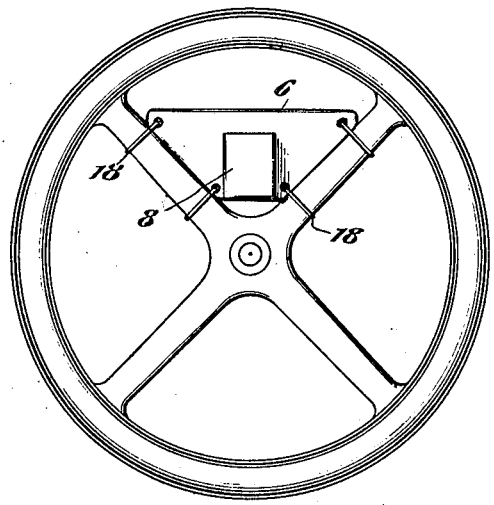
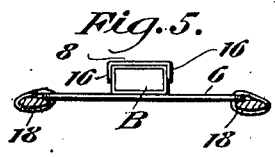
Witnesses
Inventor
Wilbert R. Ward
By Victor J. Evans
Attorney

UNITED STATES PATENT OFFICE.

WILBERT R. WARD, OF ELDORADO, OKLAHOMA.

MATCH-BOX HOLDER FOR AUTOMOBILES.

1,289,978.          Specification of Letters Patent.          Patented Dec. 31, 1918.

Application filed April 20, 1918. Serial No. 229,759.

*To all whom it may concern:*

Be it known that I, WILBERT R. WARD, a citizen of the United States, residing at Eldorado, in the county of Jackson and State of Oklahoma, have invented new and useful Improvements in Match-Box Holders for Automobiles, of which the following is a specification.

This invention relates to article holding devices, particularly to match box holders, and has for its object the provision of a device adapted for attachment upon a convenient portion of an automobile whereby a box of matches may be supported within easy reach of its operator or of the occupants.

An important object is the provision of a device of this character which will clamp a match box in position to prevent accidental displacement thereof and which is so formed as to permit the insertion of the operator's finger for sliding out the match holding portion of the box.

Another object is the provision of a device of this character which is formed from a single piece of material having portions thereof bent to engage a match box and other portions bent to form attaching means whereby the device may be supported upon some convenient portion of the automobile.

With the above and other objects in view such as extreme simplicity and cheapness, efficiency in use, durability in service, and a general improvement of the art, the invention consists in the novel construction to be hereinafter more fully described and claimed and illustrated in the accompanying drawing in which:—

Figure 1 is a perspective view of the device applied to a fragment of an automobile wind shield.

Fig. 2 is a vertical sectional view through the device.

Fig. 3 is a view of the blank from which the holder is formed.

Fig. 4 is a plan view showing a modified form of my device attached upon a steering wheel and Fig. 5 is a cross sectional view illustrating the engagement of the securing members with the spokes of the steering wheel.

Referring more particularly to the drawing the numeral 5 designates the blank of which my device is formed, this blank including a relatively large portion 6 having its sides converging toward a neck 7 terminating in a somewhat enlarged head 8. The neck portion 7 is provided with a preferably circular hole 9 for a purpose to be hereinafter more fully described. The relatively large portion 6 of the blank is bent along the line 11 to provide a tongue 12 parallel with and spaced slightly from the body portion 6. The blank is further bent along the lines 13 and 14 and the sides of the reduced neck 7 so that the portion 8 will extend substantially parallel with and spaced from the body. The side portions of the head portion 8 are bent along the lines 15 at right angles to the body portion 8 to provide flanges 16 extending toward the main portion 6.

When the device is thus assembled, it may be readily attached upon the upper edge of the lower pane of an automobile windshield by engaging it over said upper edge with the body portion 6 disposed against the inner side of the glass and the tongue member 12 disposed against the outer side thereof. It is of course necessary that the material be resilient in its nature so that the tongue member 12 will have sufficient resilience to clampingly engage the wind shield. The portions 6, 7 and 8 and the flanges 16 will then form a receptacle into which a match box of the safety type may be readily inserted. The portion 8 must normally incline somewhat toward the portions 6 so that when a match box is disposed between the portions 8 and 6 it will be resiliently clamped in position. When the box B is thus disposed within the device, the match containing drawer portion thereof will be disposed over the circular hole 9 so that the user may by inserting his finger through the hole 9 push the drawer upwardly so that he may grasp the desired number of matches and extract them from the drawer. The member 8 bears against the box with sufficient pressure that the outer portion of the box is prevented from movement when the drawer is thus pushed upwardly.

In case it is not desired to attach the device to the wind shield, it may be fastened upon the dash or other desired locations by means of any suitable screws passing through holes 17 formed in the body portion 6.

Referring to the modification shown in Figs. 4 and 5 it will be noted that the structure is identically the same except that in this form I provide wire members 18 which are passed through the holes 17 and secured around the spokes of a steering wheel From the foregoing description and a study of the drawing it will be apparent that I have thus provided a simple device whereby a box of matches may be suitably supported upon any desired portion of an automobile whereby the matches may be maintained within convenient reach of the operator or other occupants and which is so formed that the box will be maintained in proper position without danger of displacement.

It will of course be understood that I reserve the right to make such changes in the specific construction of my device as will not depart from the spirit of my invention nor the scope of the subjoined claim.

Having thus described my invention what I claim is:—

A match box holder formed from a single sheet of material bent to form a body portion, a support engaging tongue spaced from said body portion, an integral supporting portion extending at right angles to said body portion, a clamping plate extending from the edge of said supporting portion and inclined toward said body portion, and flanges on the sides of said clamping plate extending at right angles thereto and to said body portion and extending toward said body portion, said sheet of material being resilient whereby said clamping plate will be resiliently urged toward said body portion, said body portion, said clamping plate and said flanges coöperating to form a substantially rectangular inclosure for receiving a match box with said supporting portion engaging against the bottom of the box, and said supporting portion being provided with a hole for the insertion of a finger whereby the drawer portion of a box may be moved.

In testimony whereof I affix my signature.

WILBERT R. WARD.